United States Patent [19]

Fontes

[11] 4,385,949
[45] May 31, 1983

[54] METHOD OF TRACING CONTOUR PATTERNS FOR USE IN MAKING GRADUAL CONTOUR RESIN MATRIX COMPOSITES

[75] Inventor: Manuel J. Fontes, San Jose, Calif.

[73] Assignee: The United States of America as represented by the Administrator of the National Aeronautics and Space Administration, Washington, D.C.

[21] Appl. No.: 136,660

[22] Filed: Apr. 2, 1980

[51] Int. Cl.³ ............................................. B44C 00/00
[52] U.S. Cl. ...................... 156/59; 156/264; 156/344; 273/240; 434/88; 434/403
[58] Field of Search .................. 156/58, 59, 344, 264; 35/41, 26; 33/21 R, 27, 18 B; 401/9, 10; 273/32 H, 240

[56] References Cited

U.S. PATENT DOCUMENTS

| | | | |
|---|---|---|---|
| 473,901 | 5/1892 | Blanther | 35/41 |
| 1,552,406 | 9/1925 | Akerbladh | 35/26 |
| 2,711,022 | 6/1955 | Salfelder | 35/26 |
| 2,981,147 | 4/1961 | Carter et al. | 156/58 |
| 3,181,865 | 5/1965 | Tout | 273/240 |
| 3,316,641 | 5/1967 | Aijala | 33/18 B |
| 3,419,971 | 1/1969 | Ribkin | 273/240 |
| 3,742,620 | 7/1973 | Knoll | 35/41 |
| 3,928,925 | 12/1975 | Gay | 35/26 |
| 3,988,834 | 11/1976 | Anderson | 33/21 R |

FOREIGN PATENT DOCUMENTS

| | | | |
|---|---|---|---|
| 994095 | 8/1976 | Canada | 33/21 R |
| 670920 | 4/1952 | United Kingdom | 35/41 |

*Primary Examiner*—Jerome W. Massie
*Attorney, Agent, or Firm*—Darrell G. Brekke; John R. Manning

[57] ABSTRACT

The invention relates to methods for making laminate patterns for a resin matrix composite structural component. A sheet of paper (28) is temporarily adhered to a model (26) of the structural component. Pen (13) is positioned on paper (28) with spindle (24) touching the model surface opposite the pen. The pen and spindle are moved along the path that maintains the aforementioned contacts. The resulting line (31) traced on paper (28) is a model constant-thickness locus and provides a pattern for a single lamination of resin-impregnated fabric. The steps are repeated to make other patterns and each time the steps are repeated the distance between the tracer and the spindle is changed to correspond to the thickness of a lamination.

7 Claims, 3 Drawing Figures

FIG. I

METHOD OF TRACING CONTOUR PATTERNS FOR USE IN MAKING GRADUAL CONTOUR RESIN MATRIX COMPOSITES

ORIGIN OF THE INVENTION

The invention described herein was made by an employee of the United States Government and may be manufactured and used by or for the Government for governmental purposes without the payment of any royalties thereon or therefor.

DESCRIPTION

1. Technical Field

The invention relates to resin matrix composite technology and more particularly to methods for making patterns for resin-impregnated fabrics.

2. Background Art

Structural materials with built-in strengthening agents are often called composites. Carbon fibers are among the strongest and stiffest of the reinforcing materials being used today in resin-matrix composites. These composites are already being used in the aerospace, automotive and recreation fields and the demand is growing. The outstanding design properties of carbon-fiber/resin matrix composites are their high strength-to-weight ratios. With proper selection and placement of fibers, the composites can be stronger and stiffer than equivalent steel parts and weigh from 40 to 70% less. Direct weight savings of these structures can, in turn, lead to additional, indirect weight savings by requiring lighter support members. The durability of continuous-carbon-fiber composites, in terms of fatigue resistance, is outstanding. With the use of the proper matrix systems, these composites can have excellent environmental resistance and retain useful properties for long periods of time at temperatures over 300° F.

When a wind tunnel metal structural component, such as a blade, fails during a test, metal fragments can pierce the skin of the tunnel and injure nearby personnel. Additionally, the metal fragments can enter the compressor and ruin it. In one known instance, a metal propeller blade on a model failed during a test and caused over two million dollars damage to the compressor. Had the propeller been made of carbon-fiber composite rather than metal, the damage would have been greatly reduced.

One popular method of making a carbon-fiber composite structural component is to pre-impregnate a fabric with an appropriate resin, partially cure the resin to a "B" stage, and bring layers of the pre-impregnated partially cured fabric together into a suitable mold wherein the laminate is completely cured under heat and pressure. When a flat, constant thickness carbon-fiber composite structural component is desired, it is a simple operation to cut the laminae as they are all one size. However, when it is necessary to prepare laminae for components with contours or other complex shapes, pattern preparation is a very time consuming process. A draftsman must first establish surface points on the component in an X-Y-Z coordinate frame and then identify all the appropriate X and Y points for every desired Z setting (each corresponding to a different lamination). For each Z setting, the X and Y points have to be interconnected with a single line to form a pattern outline. Alternatively, a special program can be written for a computer and the coordinate points for each lamina can be calculated by the computer.

DISCLOSURE OF INVENTION

This invention provides an improved pattern making method which obviates the disadvantages of prior art processes and enables composites to be fabricated quicker and at reduced cost. According to the present invention, a paper film is temporarily adhered to a model of the structural component that is to be fabricated. A line is traced on the paper which represents a constant-thickness locus line. The paper is pulled away from the model and a piece of fabric is cut in conformance with the locus line. The process is repeated for different thicknesses until all laminae are prepared. After the laminae are stacked and arranged in a mold, they are cured by being subjected to increased temperature and pressure.

DETAILED DESCRIPTION OF THE INVENTION

Figure 1:
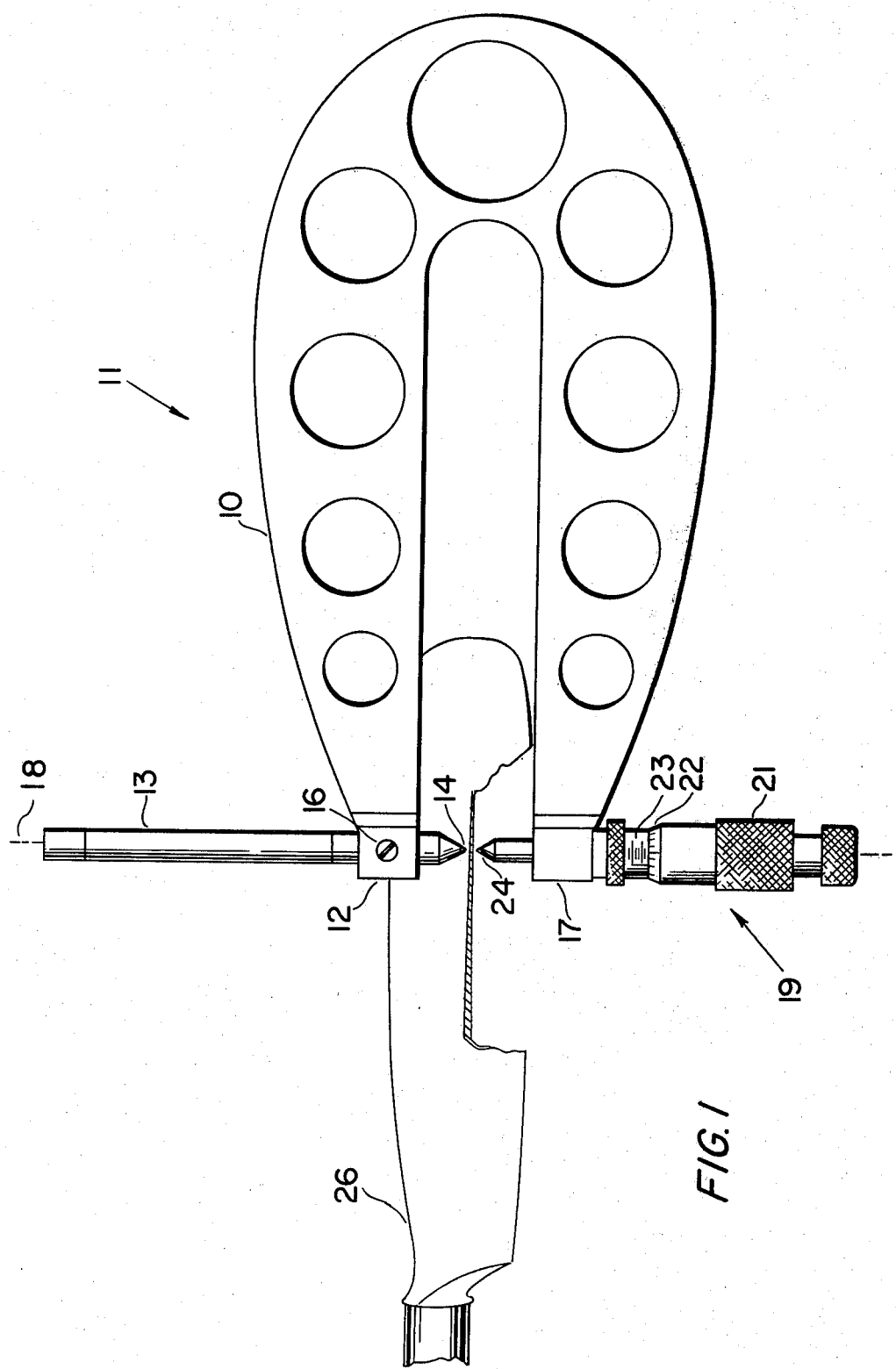
FIG. 1 is an elevational view of a tool for drawing constant-thickness locus lines.
Figure 2:
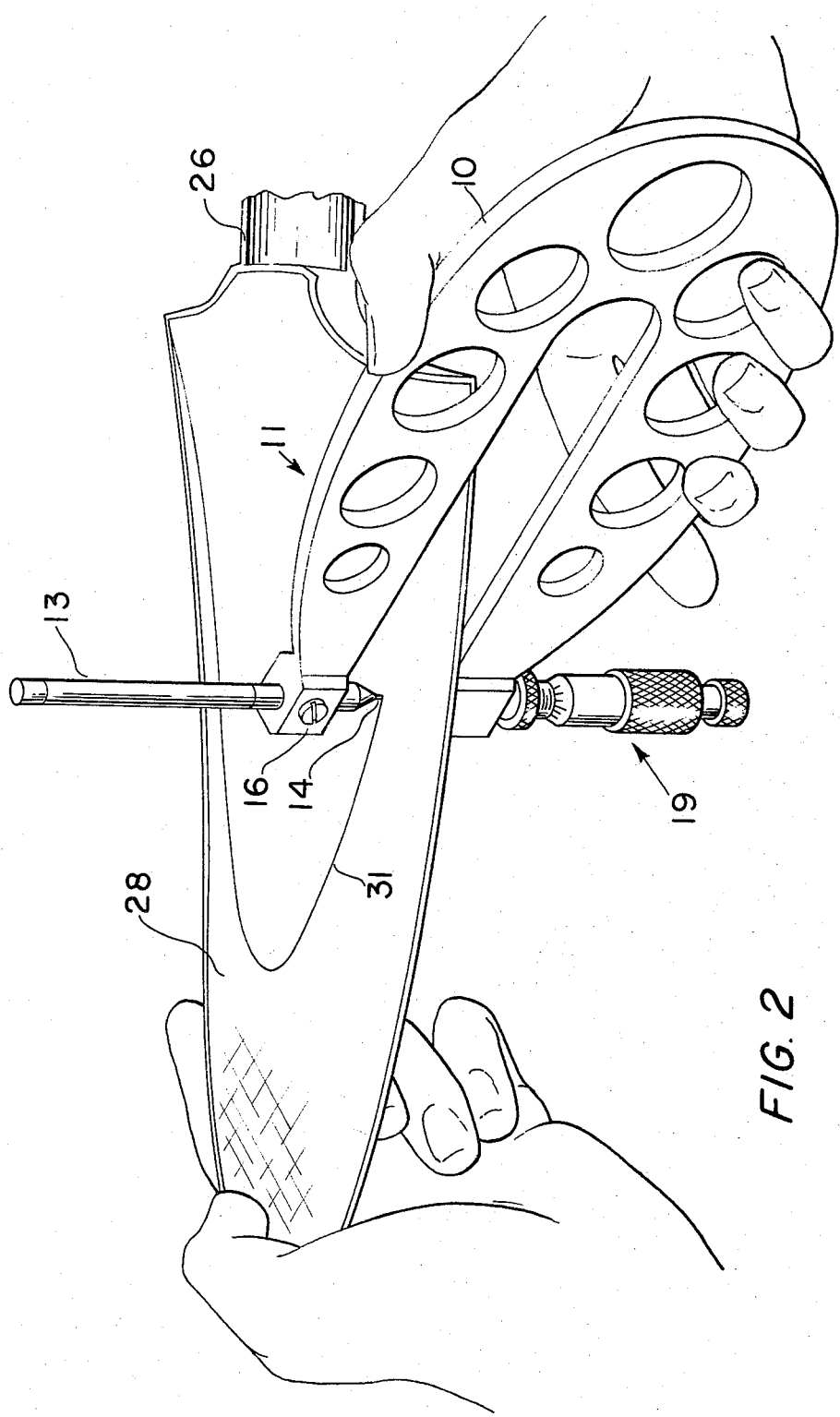
FIG. 2 is a perspective view showing how a constant-thickness locus line is drawn on a paper adhered to a model.

FIG. 1 illustrates a scribe caliper 11 with a U-frame or yoke 10. Extremity 12 of U-frame has a cylindrical aperture in which is placed a ball point pen 13 with a writing ball 14. Pen 13 is secured to frame 10 by means of set screw 16. A gage 19, of the type used on a conventional micrometer is rigidly secured in extremity 17 of yoke 10. The longitudinal axis of pen 13 and the longitudinal axis of gage 19 lie on axis 18 with writing ball 14 facing spindle 24 of gage 19. When thimble 21 is rotated in one direction, spindle 24 is advanced along axis 18 towards writing ball 14. When thimble 21 is rotated in the opposite direction, spindle 24 recedes into extremity 17 and increases the distance between fixed writing ball 14 and spindle 24. The linear displacement of spindle 24 along axis 18 is indicated by means of thimble scale 19 and sleeve scale 20. Writing ball 14 and spindle 24 rest on opposite surfaces of a model 26. Model 26 is preferably a 1:1 scale model of a structural component that is to be fabricated as a resin matrix composite. In FIGS. 1 and 2, model 26 represents a model of a propeller blade.

Referring to FIG. 2, the top side of a model 26 of the component that is to be fabricated as a resin matrix composite is covered with a very thin uniform coating of an adhesive. The commercial contact-type adhesives that are used by artists and are sold in aerosol dispensers are very well suited for this purpose. A thin sheet of paper 28 with an area approximately corresponding with the area of the model is temporarily stuck to the model. In FIG. 2, the paper is purposely shown to be smaller than the model so that the model will not be obscured. Care is taken to eliminate bulges or ripples in the paper. The gap between writing ball 14 and spindle 24 is adjusted by means of thimble 21 and set screw 16 to be slightly shorter than the thickest portion of the model of the propeller blade. The scribe caliper 11 is then moved along the one path that keeps writing ball 14 and spindle 24 in contact with the opposite surfaces of the model. As the scribe caliper 11 is moved along the path with pen 13 approximately normal to the paper, a line is drawn on the paper 28 by writing ball 14 that describes a constant-thickness locus.

Once the locus is drawn on paper 28, the paper is peeled away from model 26 and the locus provides a pattern or template. The resin-impregnated fabric to be used for the composite structural component is then cut in conformance with the pattern to provide a lamination for the resin matrix composite.

After the first template is completed, the thimble is rotated so as to move the spindle 24 toward the writing ball 14 a distance corresponding to the thickness of a composite lamination. The displacement of the spindle is registered on the thimble and sleeve scales. One anisotropic resin-impregnated fabric known as Fiberite Hy-E-1034C and manufactured by Fiberite Corporation has, for example, a thickness of 7 mils initially and flattens to approximately 5 mils when heated and compressed in a mold. A new sheet of paper 28 is then adhered to the surface of model 26 and the scribe caliper 11 is moved along the new path that keeps the writing ball and spindle in contact with opposite sides of the model. The resulting trace on the paper represents a new constant-thickness locus. When the paper is removed from the model, another ply of resin-impregnated fabric is cut in accordance with the newest pattern. The steps are repeated and patterns are made until the scribe caliper finally reaches the outer edge of the model. This completes the process for obtaining the patterns for the laminations needed for the obverse side of the structural component. The model 26 of the structural component is then turned over and the above-described pattern-making steps are repeated on the reverse side until all necessary templates are completed. In instances wherein the contours on the obverse of the model are identical to the contours on the reverse, that is, wherein the model is symmetrical to an imaginary plane separating the obverse and reverse sides, the templates made for the obverse side can of course be used to prepare the fabric laminations or plies for both halves of the structural component.

In FIG. 2, line 31 made by pen 13 depicts the locus for the nth pattern, not the very first pattern. Before the first pattern is made and the spacing between the pen and gage spindle are adjusted, the thickness of the paper/adhesive combination and the thickness of the resin impregnated fabric are of course taken into account.

Figure 3:
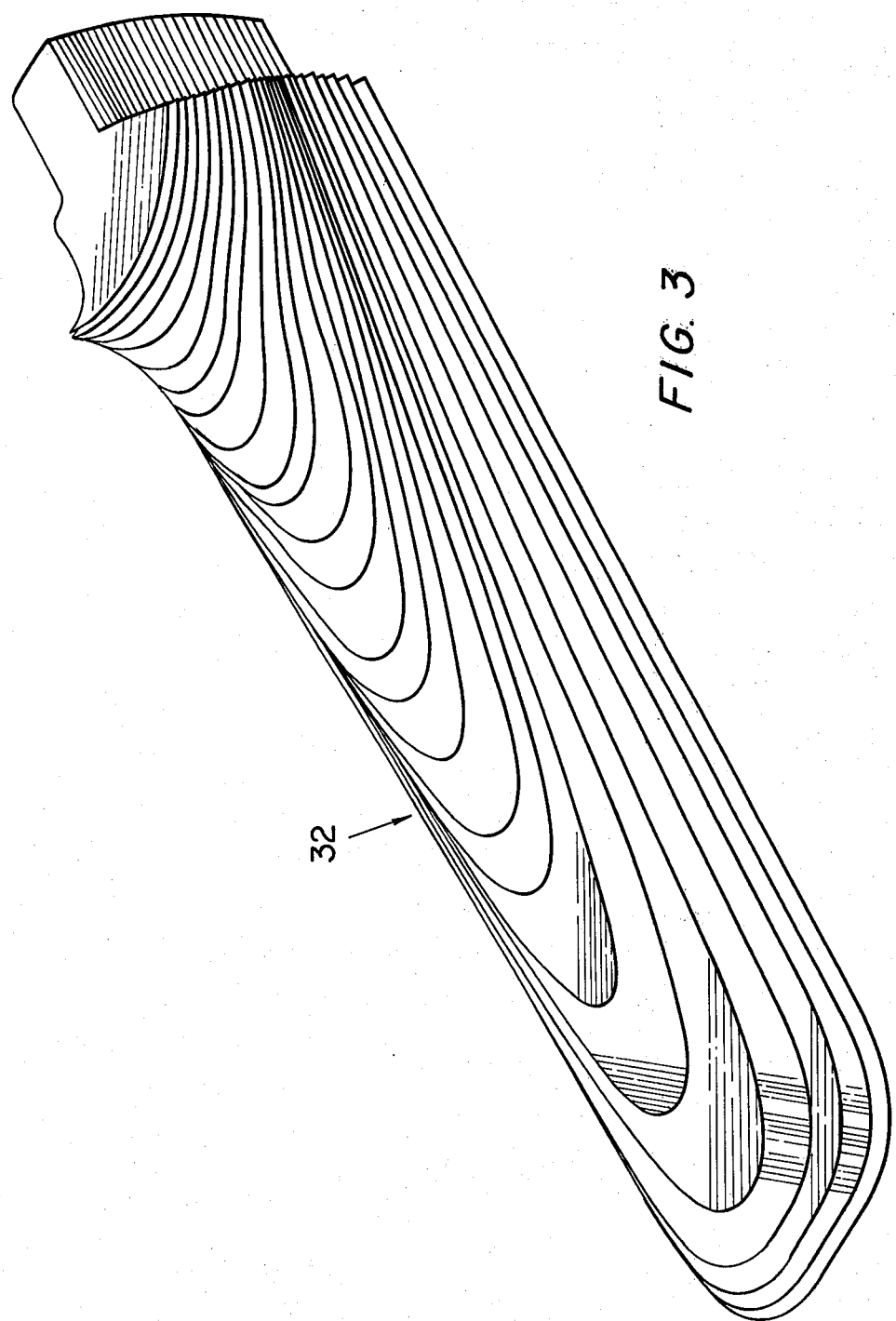
FIG. 3 illustrates a half stack of laminae for a propeller.

FIG. 3 depicts a stack of fabric laminae 32 that have been cut in accordance with the patterns made from propeller model 26. The stack represents only the top one-half of the laminations for the propeller. For purposes of illustration, the vertical scale has been exaggerated. Carbon-fiber composite plies are typically anisotropic and have fibers that are oriented at an angle of 45 degrees with the ply edge. When these plies are used to make a composite structural component, the laminae are often crossbanded (alternately arranged in interlaminar orientation of 90 degrees) in order to increase strength and fracture resistance, and to insure more uniform properties in all directions. Of course different arrangements can be chosen to achieve specific directional strengths.

After the composite plies are cut in conformance with the constant-thickness-locus patterns, half molds are made of the structural component at 1:1 scale. A suitable material for the two half molds is Fast Cast plastic manufactured by REN Plastics, Inc., Lansing, Mich. The plies for one-half of the composite component are arranged in proper sequence in the appropriate half mold and the other half mold is filled with the remaining plies for the other one-half of the component. The ply lay-up step may be performed at room temperature. To retard curing, the plies are stored in a refrigerator or freezer until they are ready to be used for the next step.

Next, the component halves are each transferred to a slightly oversize half mold lined with a cloth. Each half mold is just large enough to accommodate the appropriate component half and a layer of bleeder cloth. The bleeder cloth acts as a permeable interface between the mold surface and the component half. The cloth may be, for example, a compressible material such as release fabric 1B301-F54 manufactured by HEXCEL Corporation, 11711 Dublin Blvd., Dublin, Calif. 94566. Each mold is placed in a vacuum bag and subjected to a temperature of 250° F. for a period of one hour. During the squeezing and heating, the bleeder cloths extract excess resin from the plies and draw the plies together to eliminate interlaminar wrinkling and slack so that maximum ply strength will be realized. At the conclusion of the bleeding process, the molds and plies are chilled at 0° F. for about two hours. The now stiff component halves are removed from the over-size half molds and returned to their original lay-up mold after any flash material is removed. The two lay-up half molds are then mated and heated to 200° F. for about one hour in order to coalesce the two component halves. The resulting lamination mass is cooled in a 0° F. environment for approximately two hours it is removed from the lay-up molds and inserted in a metal cure mold that has the exact dimensions of model 26. The cure mold is then installed in a hydraulic press having adjustable-temperature plaques. Alternatively, the cure mold may be provided with passages that accommodate a temperature-controlled fluid such as oil. The temperature of the plaques is elevated from ambient room temperature and a pressure of approximately 100 psi is applied to the cure mold by the plaques until the mold temperature reaches 250° F. Once this temperature is obtained, the cure mold pressure is raised to 200 psi and the temperature is increased to 350° F. At the termination of a two-hour cure period at the 350° F. temperature, the plaques of the hydraulic press are opened and the composite structural component is removed from the mold while it is still hot. Excess or flash material is trimmed away from the composite and it is lightly sanded before receiving a thin coat of expoxy such as EPON 828 RESIN manufactured by Shell Chemical Company. Lastly, the coated composite is returned to the cure mold and kept at 150° F. for about one hour. During this final stage, it is unnecessary to stress the mold with the hydraulic press. When the composite is removed from the mold, it is ready to be put into service for its intended purpose.

During the template making process, line 31 is drawn on paper 28 while paper 28 is not planar. When the paper is removed from the model 26 and flattened, there is a slight distention of the locus. Experience to date has shown that the loci distentions do not alter the dimensions of the finished composites. Apparently, there is sufficient play or give in the plies during the curing steps to compensate for loci distentions during the pattern making steps. Anyone desiring to obviate the aforementioned distention can utilize a pantograph to transfer the locus on the paper adhered to the model to a planar sheet of paper. Alternatively, one can photograph locus line 31 from a normal attitude before the paper 28 is peeled away from model 26. By making an enlarged print of the resulting negative to the correct scale, a line will be created on the print which corresponds to the undistended constant-thickness locus.

I claim:

1. The method of making a laminate pattern for a resin matrix composite structural component having first and second opposed surfaces each having gradual contours, said method comprising:
   temporarily adhering a sheet of paper to the surface of a model of said structural component that corresponds to said first surface; and
   tracing a line on said sheet of paper representing a model constant-thickness locus.

2. The method of making ply patterns for a resin matrix composite structural component having first and second opposed surfaces each having gradual contours, said method comprising:
   temporarily adhering a first sheet of paper to the surface of a model of said structural component that corresponds to said first surface;
   tracing a line on said sheet of paper representing a model constant-thickness locus;
   removing said sheet of paper from said model;
   temporarily adhering a second sheet of paper to the surface of said model; and
   drawing a line on said second sheet representing a model constant-thickness locus differing from the previous locus by an amount corresponding to the thickness of a resin matrix composite ply.

3. The method of claim 2 wherein the last three steps are continually repeated until the model constant-thickness loci are exhausted.

4. The method of making a laminate pattern for a resin matrix composite structural component having first and second opposed surfaces each having gradual contours, said method comprising:
   interconnecting a spindle and a line tracer so that they are coaxial and facing each other a predetermined distance apart;
   temporarily adhering a sheet of paper to the first surface of a model of said structural component wherein said model has first and second opposed surfaces corresponding to said component first and second surfaces, respectively;
   positioning said tracer on said paper with said spindle touching said second surface opposite said tracer;
   simultaneously moving said tracer and said spindle along the path that maintains the tracer on the paper and the spindle on the second surface whereby a model constant-thickness locus is traced on said paper and a laminate pattern is created.

5. A method of making ply patterns for a resin matrix composite structural component having first and second opposed surfaces each having gradual contours, said method comprising:
   interconnecting a spindle and a line tracer so that they are coaxial and facing each other a predetermined distance apart;
   temporarily adhering a first sheet of paper to the first surface of a model of said structural component wherein said model has first and second opposed surfaces corresponding to said component first and second surfaces, respectively;
   positioning said tracer on said paper with said spindle touching said second surface opposite said tracer;
   simultaneously moving said tracer and said spindle along the path that maintains the tracer on the paper and the spindle on the second surface whereby a model constant-thickness locus is traced on said paper and a ply pattern is created;
   removing said first sheet of paper from said model;
   temporarily adhering a second sheet of paper to said first surface of said model;
   changing the distance between said spindle and tracer by an amount corresponding to the thickness of a resin matrix composite ply; and
   repeating the afore-mentioned third and fourth steps in that order.

6. The method of claim 5 wherein the last four steps are continually repeated until all of the model constant-thickness loci are exhausted.

7. The method of claim 6 wherein said structural component is an airfoil.

* * * * *